March 16, 1954   L. FINCHELSTEIN ET AL   2,672,544
APPARATUS FOR WELDING BY MEANS OF ELECTROMAGNETIC
INDUCTION HEATING
Filed Nov. 22, 1949   2 Sheets-Sheet 2

INVENTORS:
LAZARE FINCHELSTEIN AND
ANTOINE RODOLPHE BAFFREY
BY

Patented Mar. 16, 1954

2,672,544

UNITED STATES PATENT OFFICE 2,672,544

APPARATUS FOR WELDING BY MEANS OF ELECTROMAGNETIC INDUCTION HEATING

Lazare Finchelstein, Paris, France, and Antoine Rodolphe Baffrey, Liege, Belgium, assignors to Societe Marocaine Technique et Commerciale, a corporation of Morocco Application November 22, 1949, Serial No. 128,792

Claims priority, application France November 30, 1948

13 Claims. (Cl. 219—6)

This invention relates to welding and similar processes by heating the work-piece by means of alternating electric currents producing a magnetic field linked with the edges of the joint. It relates more particularly to the butt-welding of all kinds of metal sheets, the edges of which may be of a rectangular, or flanged or other shape, and is more particularly intended for the manufacturing of pipes made of folded sheets. The frequency of the induction current is chosen by preference in the musical frequencies range, but, in certain circumstances and by respecting certain conditions, its range may be extended to higher frequencies and even into the radio-frequencies field. The eddy-currents and hysteresis losses in the metal mass due to the magnetic-field action, raise the joint edges temperature to a softening level, simultaneously a continuous lateral pression is exerted on the work-piece, so as to press together the plastic made surfaces and insure a perfect bonding effect.

This invention has for its principal object a new method of electro-magnetic welding insuring a better localization of the heat in the edges of the joint and near the contacting surfaces, a deeper penetration of the heat into the work-piece and owing to that, a uniform heating of all cross-section of the joint, and a higher thermic efficiency, securing in this way a continuous and highly reliable welding of sheets of an appreciable thickness which have not to be thoroughly shaped and cleaned prior to the welding process, as was necessary heretofore in all kinds of electrical weldings.

More particularly, this invention has for its object to secure, in a continuous and a fast way, a reliable electrical welding of pipes withstanding important pressions, made of circularly shaped sheets of iron of magnetic or not type of a substantial thickness, the edges of which do not need to be perfectly cut, smoothed and cleaned, as it was necessary heretofore.

This invention has also for its object a new method of pipe welding according to which, owing to the heat effect concentration near the joint, it becomes possible to press laterally the edges of the folded sheet, immediately after they have been brought to the necessary conditions, and therefore secure a perfectly reliable tight joint, reducing at the same time the apparatus length.

This invention has also for its object to provide a new form of electro-magnetic inductor to secure the said welding process, of a particularly robust design, easy to regulate in position in respect to the joint; and giving rise to a high concentrated intensive magnetic flux near the contacting surfaces of the joint.

Still another object of this invention is to provide a new welding apparatus for continuous and automatic welding of pipes.

It has already been proposed to weld the pipes by means of the high frequency induction heating, using an inductor coil of a tubular shape through which the pipe was continuously drawn. The entire surface of the pipe, and not only the joint edges, was so heated to a softening temperature necessary to fulfill the welding process, and a large part of the heat energy was thereby unnecessarily lost. The means to press together the edges have had to be placed relatively far from the heated spot in order not to damage or deform the softened pipe walls, making thereby the apparatus more cumbersome and the finished joint less reliable, as the pressure was exerted much later than the period of the best plastic conditions of the joint faces. On the other hand, it was also necessary, in order to protect it against the heat radiated from the work piece, and avoid all accidental contacts between them, to introduce a certain distance between this coil and the pipe, thereby reducing greatly the magnetic linkage and the apparatus efficiency. The pipe acted as a short-circuited massive winding causing very high electric losses and the total efficiency was therefore rather low.

At present, the pipes are generally manufactured by welding the edges by means of so called resistance method using a narrow roller contact overlapping the two edges of the joint and leading therein a high intensity electrical current. But this method securing a reliable and continuous output, needs very thoroughly cut, smoothed and cleaned contacting surfaces in order to realize a straight and well closed joint path necessary to maintain simultaneously the two edges continuously in contact with the roller. The surface of the pipe must also be well cleaned so as to avoid any irregularities of contact with the roller producing arcs damaging the roller surface. When two rollers are used on the two sides of the seam, the surface of the pipe must always be kept clean and smooth, in order to avoid the arcs, and the opposite surfaces must be thoroughly shaped to insure a uniform current distribution through the joint section. In both cases the rollers are rapidly worn out and must be frequently changed.

In the high frequency apparatus used up to now to heat metallic work pieces for brazing, soldering or joining purposes, the magnetic flux linked with the piece was produced by means of an inductor coil of a flat type, which plane was always substantially parallel to the sheets to be heated. The coil conductors carrying current were generally made in hollow tubular form in order to enable cooling water circulation. As the coil, for security purposes, must be fixed at a certain appreciable distance from the work-surface, the efficiency of the apparatus is relatively low and the quality of the heat developed in the metal limited the travelling speed, in case of a continuous working. If, in order to increase the heat concentration, frequencies of the radio range were employed, owing to the skin effect, only a very thin layer of the metal surface was heated, and this method was therefore limited to join relatively thin sheets. The inductor coil comprises generally two bars extending parallel to the joint path and placed on two sides of it. In order to secure a sufficient magnetic coupling, these bars must be largely spaced. The magnetic flux penetrates in the piece substantially parallel to the contacting surfaces of the joint, and is linked with a relatively large part of the piece-edges, as it will be more clearly explained at the end of this specification, in connection with Figure 3.

The heat is therefore distributed over a relatively large portion reducing the thermic efficiency; on the other hand, the conditions of the contact between the joint surfaces are in this case of a substantial importance for the process of transforming of the magnetic flux into heat, and the sheets must be, prior to the joining process, thoroughly cleaned and even smoothed.

If, in order to improve the magnetic linkage, the coil is brought very near to the metal surface, the slightest displacement of the latter would disturb the heat distribution and hence the welding conditions; on the other hand, the heat radiated from the work, and the metal particles accidentally projected from the heated surface, would damage the coil; furthermore, it would be difficult to avoid accidental short-circuits between the coil and the work, which risk puncturing the tubing and causing serious accidents. For all these reasons, to our knowledge, one never has applied this method of high frequency heating to welding of pipes.

We believe to be the first to propose an industrial method for continuous and perfectly tight welding of sheets of a substantial thickness, designed for pipe manufacturing and similar purposes, using a magnetic inductor energized by alternating current of a certain frequency, this method securing a resistant and tight bond through the entire cross-section of the joint, a relatively high travelling speed of the pipe, without any of the difficulties encountered hitherto in all above mentioned methods, with a good efficiency and perfect results even using only coarsely cut and cleaned sheets.

According to one feature of our invention, the inductor is placed relatively to the joint so as to let the magnetic lines of force cross the opposite surfaces of the joint in a substantially perpendicular relation.

According to another feature of our invention, the inductor is given a particular shape and it is placed so as to let the magnetic flux penetrate in the metal-sheet on one side of the joint path and to leave the sheet on the other side of the joint.

According to still another feature of our invention, the flux is produced by means of an inductor comprising a magnetic iron core terminated through two pole pieces placed near and opposite the joint edges, the work acting therefore like an armature closing the magnetic path of the inductor.

According to still another feature of our invention, the inductor coil carrying the energizing alternating current has one of its conductors extending longitudinally parallel to the joint path and opposite to it.

According to still another feature of our invention, the inductor core is of an elongated shape parallel to the joint path and is formed of stacked isolated magnetic-iron sheets terminating through two pole tips separated by a notch or slot in which is located one conductor of the magnetizing coil; this conductor is placed relatively to the work piece so as to let the plane of symmetry of these pole-tips pass through the cross-section of the joint. Preferably, the surface of these tips opposite the joint edges, will be given a circular shape substantially the same as the surface of the pipe.

According to still another feature of our invention, the magnetizing coil comprises one bar-shaped conductor embedded in the notch and two other bar like parallel conductors, connected in parallel to the first one, disposed in a close contact with the iron-core, on the two sides of its cross-section, and connected each to one terminal of the secondary of a step down current supplying transformer.

According to still another feature of our invention, the pipe welding apparatus comprises an iron core inductor substantially as described, whose pole-tips are set near and opposite to the edges of the joint, a supply of alternating current of about 500 to 15,000 cycles per second, chosen according to the thickness of the pipes, a continuous feeding mechanism for the pipe advance, and a system of rollers placed just after the inductor in the direction of the pipe travelling, exerting a lateral pression on the joint edges.

The novel features that we consider characteristic of our invention are set forth in their particulars in the appended claims. The invention itself, however both as to its organisation and method of operation, as well as additional objects and advantages thereof, will be best understood from the following description of one embodiment thereof, when read in connection with the accompanying drawings, in which:

Figure 4A:
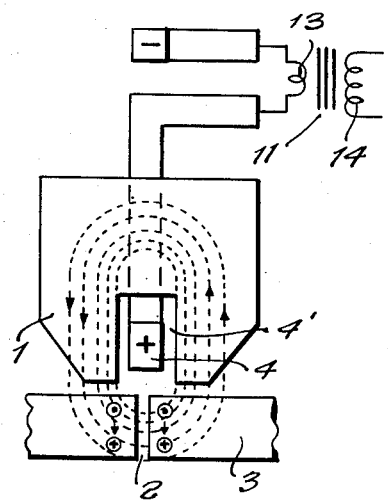
Figure 4 is a diagrammatic view of the arrangement according to our present invention, showing the magnetic flux to the joint edges relation, and setting out the fundamental differences between the electro-magnetical conditions of this system and those of the system illustrated on the Figure 3.

And Fig. 4A is a similar diagrammatic view showing the connection to the source of current.

Referring more particularly to the drawing, wherein similar reference characters designate corresponding parts throughout, there is shown a work-piece 3 made of a magnetic metal sheet bent into the form of a pipe and which has to be welded all along the joint or seam 2 between two opposite edges of the sheet. This pipe is given a continuous travelling movement from the left to the right in the arrow direction, by means of a system of rollers 16. Another system of rollers disposed on the two sides of the pipe and of which only one is shown, in 10, exerts a lateral pression on the pipe walls, as soon as the joint contacting surfaces are brought into the necessary plastic conditions, as will be described later. These rollers are regulated in position by means of a fixture F, comprising an endless screw 18, controlled by a wheel 19, and fixing the spacing between two jaws 17, supporting the rollers. Each of them comprises a ring 20, of a non magnetic material, such as copper, interrupting the magnetic leakage paths that may be formed by these rollers. 1 represents the magnetic inductor formed by a plurality of stacked insulated sheets of magnetic iron transverse to the joint path, held in position by the tubular conductors 5—5' described later. This inductor terminates through two pole-tips 1'—1', disposed on the two sides of the joint and symmetrically to it. Preferably, in order to improve the magnetic flux linkage, the end surface of these tips is given the same circular form as that of the pipe wall. The inductor extends lengthwise parallel to the pipe, the plane of symmetry of the pole pieces passing over all through the joint. In the inside of the notch or slot 4', formed by the pole-pieces is placed a magnetizing alternating current carrying conductor 4, made of a red copper rectangular section tubing enabling cooling water circulation. It is provided with an additional cooling fin $f$. This conductor extends lengthwise parallel to the seam 2, and opposite to it. We have provided a distance of about 2 mm. between the pole-tips and the work, and placed the conductor so as to introduce an about double distance between it and the joint surface. This latter distance may be substantially modified. The one end of the tubular conductor is connected, through the tubular branches 5, to two parallel conductor tubings 6 and 7, which are connected to a single terminal fixture 8. In the same way the other end of the conductor 4 is connected, through the tubular branches not shown, to two parallel tubings, 6' and 7', leading to a single terminal 8'. An insulator bloc, 15, separates the two terminals. The conductors 6, 6', 7 and 7', form a ring squeezing together, through a suitable insulating sheet 21', the inductor sheets. Two band shaped conductors 13 and 13' supply these terminals with heavy alternating current chosen within or near the musical frequency range, from the secondary 11 of a stepdown transformer, whose primary winding 14 is fed by an alternator not shown. We have observed that a frequency of 500 to 15,000 cycles per second, has given up to now, the best practical results for the proposed water or gas pipe welding.

The arrows in the conductors represent the current flow distribution, at a certain instant, in the magnetizing coil. The two branches, 6 and 7, receiving the current from the conductor 13 through the input 8, supply their current in parallel to the single conductor 4, and the return path of the current, after it has passed through this conductor, is formed by two other parallel branches, 6' and 7', the output terminal 8' and the flat conductor 13'. The described apparatus comprising the inductor and the feeding transformer is fastened to a fixture, not represented, which is supported by an appropriate frame in such a way as to enable a distance regulation between the pole-tips and the work piece. The cooling water circulation is secured through the inlet tubing 9 and the outlet tubing 9'.

In order to increase the density of the flux penetrating into the work piece near its seam, the pole pieces 1' receive a continuously decreasing section as the flux approaches the air-gap. On the other hand, they are spaced apart substantially more than twice the air gap, in order to link the totality of the flux with the joint edges and to reduce as much as possible the magnetic leakage through the notch. The parts of the pipe wall opposite the pole-tips act therefore as an armature of an electro-magnet closing its magnetic path.

In operation, the sheets of iron are first folded to a circular shape in order to approach the edges of the joint. The pipe is then continuously pushed under the inductor. The magnetic flux penetrates into the one edge of the joint, crosses the latter, as it is represented on the schematic Figure 4, and leaves the pipe at the other edge of the joint. The heat developed in the iron mass by eddy currents and hysteresis losses, brings the contacting surfaces to a white brilliancy temperature (of about 1100° centigrade), softening thereby the metal which becomes plastic. Under the action of the pression rollers exerted immediately after, the metal particles of the entire section of the contacting surfaces penetrate into each other securing thereby a highly reliable and durable bound, supporting test pressure of 20 or even more kilograms per square centimeter.

Owing to the shortened air gap and reduced section of the pole-tips, practically all the flux is linked with the joint edges, and is quite uniformly distributed over their section. All flux cross the contacting surfaces, in a substantially perpendicular relation. The magnetic induction in the metal mass gives rise to a current which, in accordance with the instantaneous direction of the magnetic lines follows a close path in each edge, appearing in the figure plane at the point marked by a point, taking the direction of the arrow and leaving this plane at the cross marked point. These eddy currents do not cross the joint, and the heat they develop is not a function of the mechanical conditions of the joined surfaces prior to the welding process. The irregularities of this contact do not, on the other hand, influence the magnetic field strength, as they are practically negligible in respect to the influence of the air gap between the poles and the metal surface. The flux being concentrated in the end portions of the joint-edges, the heat effect is a rather concentrated one and the necessary welding conditions are rapidly secured, enabling thereby a relatively high travelling speed.

Figure 4:
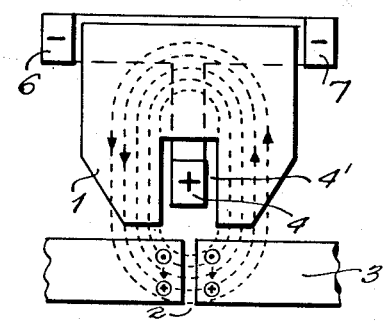

The two back conductors 6 and 7 may be, without changing their electro-magnetical action on the core and the flux distribution in the poles, replaced by a single return conductor shown on the Figure 4 by dashed line, forming with the tubing 4 a flat coil, the plane of which lies in the plane of the joint surface.

Figure 1:
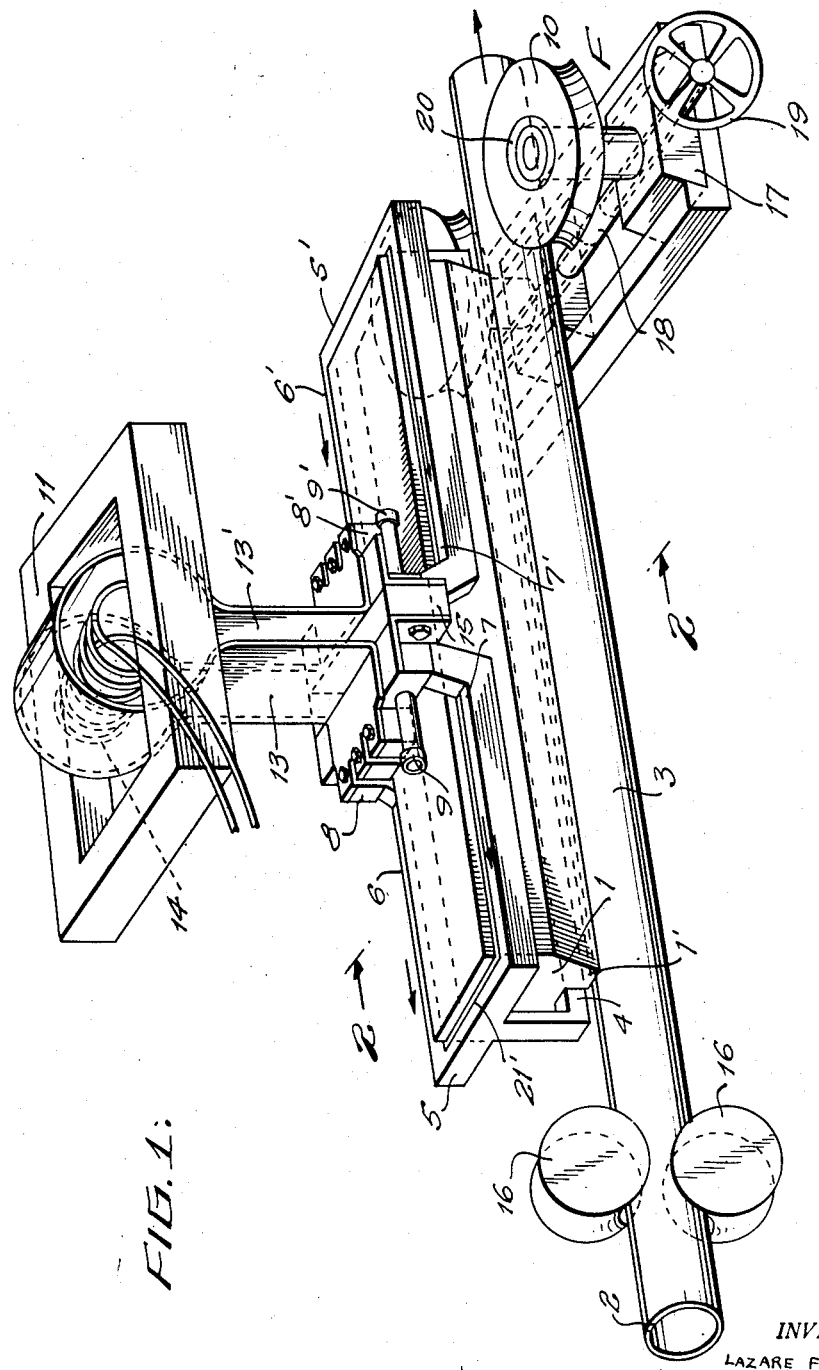
Figure 1 is a perspective view of the welding apparatus for manufacturing of pipes, constructed according to our present invention.
Figure 2:
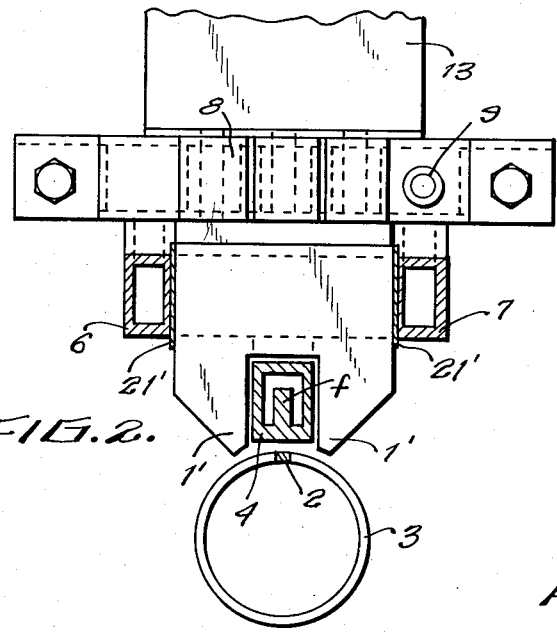
Figure 2 is a cross-sectional view of the Figure 1, through the plane 2—2.
Figure 3:
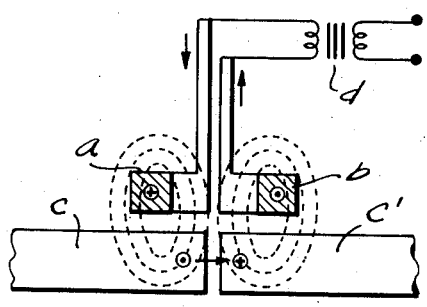
Figure 3 is a diagrammatic view of an arrangement according to the prior art, for butt-welding using a flat coil inductor parallel to the metal surface.

On the contrary to Figure 4, Figure 3 represents diagrammatically the electro-magnetical condition in the case one would make use of a flat inductor coil parallel to the metal surface, according to the present standard practice in the high frequency soldering or brazing industry. The two conductors a—b of this coil extend parallel to the joint path between the edges c—c' of the work piece, and perpendicularly to the drawing plane. The current circulation is designated by a point and a cross in their cross-section. This coil is energized by a transformer $d$. It will be noted that the magnetic flux lines linked with the work penetrate, in this case, the metal mass substantially parallel to the contacting surfaces. Each edge closes independently the magnetic path, so that practically no flux crosses the contacting section. The eddy currents, induced by this flux, are represented in the same manner as in the Figure 4. They must cross the joint and therefore the contacting conditions of the latter exert a substantial influence on the welding operation. On the other hand, the magnetic flux being distributed in a relatively large portion of the edges, for a given travelling speed, the temperature that may be reached is relatively low. If, in order to increase it, very high frequency energizing current is used, the heat would be concentrated, owing to the skin effect, only on the surface of the metal and the bonding effect would be secured only at the superior part of the joint.

By applying the method of our invention and using the described apparatus, we have welded pipes of 3 millimeters thickness, withstanding high testing pressures of about 20 kilograms per square centimeter, with a travelling speed of 12 meters per minute. The frequency employed was as of 4000 cycles per second, and the developed magnetizing force of about 4000 ampere-turns.

Although we have shown and described but one form of the inductor constructed according to our invention, and one form of the welding apparatus in which this inductor is utilized, it will be apparent to those skilled in the art that many other forms of inductor and apparatus are possible. For example, the section form of the conductor may be changed, and supplementary cooling fins may be added. Instead of a single conductor in the notch between the pole pieces, carrying a heavy current, according to an important embodiment of this invention, the notch can be given a much larger width in order to introduce therein several inductor turns series connected, fed directly by the alternator supplying the high frequency power, eliminating thus the step-down transformer.

The feeding conductors may also be given a different section and form and a different number may be chosen, for example, instead of two, only one may be used to form a single turn coil with the conductor in the notch. To reduce, or avoid completely the magnetic leakages through the apparatus, and especially its pressing parts, there may be provided supplementary insulating stops of a nonmagnetic material, between the axes and the rollers or elsewhere. In some cases, by using in the inductor core special magnetic sheets of iron offering little hysteresis, by reducing thickness and thoroughly insulating them, it would be possible to increase the frequency range of energizing currents.

The invention may also be applied to heat and more particularly weld pipes or other works made of nonmagnetic material, such as brass, by reducing substantially the travelling speed of the work.

Other modes of applying the principle of our invention may be employed instead of the one explained, provided the means stated by any of the following claims or the equivalent of such are used.

We therefore particularly point out and distinctly claim as our invention:

1. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove, an induction coil including a conductor portion extending lengthwise in said groove in heat inducing relationship to the edge portions of said material to be welded and supply conductor portions located outside of said groove closely adjacent to said magnetically-permeable means and on the same side of said pole faces as said groove outside of heat inducing relationship to the remainder of said material to be welded; and means for supplying alternating current to said coil.

2. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of said material to be welded and supply conductor portions the major part of which is located outside of said groove closely adjacent to said magnetically-permeable means and on the same side of said pole faces as said groove outside of heat inducing relationship to the remainder of said material to be welded; means for supplying alternating current to said coil; and moving means for moving said material to be welded with respect to said magnetically-permeable means in the direction in which said edge portions of said material extend.

3. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of said material to be welded and supply conductor portions located outside of said groove closely adjacent to said magnetically-permeable means and on the same side of said pole faces as said groove outside of heat inducing relationship to the remainder of said material to be welded; means for supplying alternating current to said coil; and moving means for moving said material to be welded with respect to said magnetically-permeable means in the direction in which said edge portions of said material extend, said moving means including a pair of rollers adapted to engage the material to be welded to urge said edge portions thereof together and being located adjacent the end of said magnetically-permeable means toward which said material is moved by said moving means.

4. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of said material to be welded and supply conductor portions located outside of said groove closely adjacent to said magnetically-permeable means and on the same side of said pole faces as said groove outside of heat inducing relationship to the remainder of said material to be welded; means for supplying alternating current to said coil; and moving means for moving said material to be welded with respect to said magnetically-permeable means in the direction in which said edge portions of said material extend, said moving means including a pair of rollers adapted to engage the material to be welded to urge said edge portions thereof together and at least partly overlapping the end portion of said magnetically-permeable means toward which said material is moved by said moving means.

5. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of said material to be welded, supply conductor portions located outside of said groove closely adjacent to said magnetically-permeable means and on the same side of said pole faces as said groove outside of heat inducing relationship to the remainder of said material to be welded, and a terminal block electrically connected to said supply conductor portions and being located on the side of said magnetically-permeable means opposite from said groove thereof; and supply means for supplying alternating current to said coil.

6. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of said material to be welded, supply conductor portions located outside of said groove closely adjacent to said magnetically-permeable means and on the same side of said pole faces as said groove outside of heat inducing relationship to the remainder of said material to be welded, and a terminal block electrically connected to said supply conductor portions and being located on the side of said magnetically-permeable means opposite from said groove thereof; and supply means for supplying alternating current to said coil, said supply means including a transformer located adjacent said terminal block and having secondary leads arranged close to each other and connected to said supply conductor portions.

7. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of said material to be welded and supply conductor portions located outside of said groove closely adjacent to said magnetically-permeable means and on the same side of said pole faces as said groove outside of heat inducing relationship to the remainder of said material to be welded; and supply means for supplying to said coil alternating current having a frequency of between 500 and 15,000 cycles per second.

8. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of said material to be welded and supply conductor portions located outside of said groove closely adjacent to said magnetically-permeable means and on the same side of said pole faces as said groove outside of heat inducing relationship to the remainder of said material to be welded, said supply conductor portions including a first pair of conductors respectively connected to opposite ends of said first-mentioned conductor portion and extending away from said groove respectively along opposite end faces of said magnetically-permeable means and a second pair of substantially U-shaped conductors extending toward each other, respectively embracing opposite end portions of said magnetically permeable means, and being respectively connected to the ends of said first pair of conductors most distant from said groove; and means for supplying alternating current to said coil.

9. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of said material to be welded and supply conductor portions located outside of said groove closely adjacent to said magnetically-permeable means and on the same side of said pole faces as said groove outside of heat inducing relationship to the remainder of said material to be welded, said supply conductor portions including a first pair of conductors respectively connected to opposite ends of said first-mentioned conductor portion and extending away from said groove respectively along opposite end faces of said magnetically-permeable means and a second pair of conductors located on the side of said magnetically-permeable means opposite from said groove thereof, extending toward each other, and being respectively connected to the ends of said first pair of conductors most distant from said groove; and means for supplying alternating current to said coil.

10. In an induction welding apparatus for butt-welding two adjacent edge portions of electrically conductive material, in combination, elongated magnetically-permeable means having an elongated face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a hollow conductor portion extending lengthwise in said groove in heat inducing relationship to the edge portions of said material to be welded and supply conductor portions located outside of said groove closely adjacent to said magnetically-permeable means and on the same side of said pole faces as said groove outside of heat inducting relationship to the remainder of said material to be welded, said hollow conductor portion having a cooling fin located in the interior thereof; and means for supplying alternating current to said coil.

11. In an induction welding apparatus for butt-welding two adjacent edge portions of a metallic sheet bent into tubular shape, in combination, elongated substantially horizontal magnetically-permeable means having an elongated bottom face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of the material to be welded and supply conductor portions located outside of said groove closely adjacent to said magnetically-permeable means and arranged on the same side of said pole faces as said groove at a substantial distance above a horizontal plane passing through said pole faces outside of heat inducing relationship to the remainder of said material to be welded; and means for supplying alternating current to said coil.

12. In an induction welding apparatus for butt-welding two adjacent edge portions of a metallic sheet bent into tubular shape, in combination, elongated, substantially horizontal magnetically-permeable means having an elongated bottom face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of the material to be welded and supply conductor portions located outside of said groove closely adjacent to said magnetically-permeable means and on the same side of said pole faces as said groove outside of heat inducing relationship to the remainder of said material to be welded, said supply conductor portions including a pair of conductors respectively connected to opposite ends of said first-mentioned conductor portion and extending upwardly therefrom respectively along opposite end faces of said magnetically-permeable means; and means for supplying alternating current to said coil.

13. In an induction welding apparatus for butt-welding two adjacent edge portions of a metallic sheet bent into tubular shape, in combination, elongated, substantially horizontal magnetically-permeable means having an elongated bottom face formed with a groove extending along the length of said magnetically-permeable means so as to form two elongated pole faces separated by said groove, said elongated magnetically-permeable means being adapted to be disposed lengthwise of the edges to be welded with said edges located opposite said groove; an induction coil including a conductor portion extending lengthwise in said groove in heat inducing relationship to the edge portions of the material to be welded and supply conductor portions located outside of said groove closely adjacent to said magnetically-permeable means and arranged on the same side of said pole faces as said groove at a substantial distance above a horizontal plane passing through said pole faces outside of heat inducing relationship to the remainder of said material to be welded; means for supplying alternating current to said coil; and moving means for moving said material to be welded horizontally beneath said magnetically-permeable means in the direction in which said edge portions of said material to be welded extend.

LAZARE FINCHELSTEIN.
ANTOINE RODOLPHE BAFFREY.

References Cited in the file of this patent

UNITED STATES PATENTS

| Number | Name | Date |
| --- | --- | --- |
| 1,201,929 | Bolus | Oct. 17, 1916 |
| 1,842,461 | Sessions | Jan. 26, 1932 |
| 1,915,082 | Blakeslee | June 20, 1933 |
| 2,020,276 | Crawford | Nov. 5, 1935 |
| 2,181,445 | Adams, Jr. | Nov. 28, 1939 |
| 2,493,950 | Dow et al. | Jan. 10, 1950 |
| 2,582,955 | Body | Jan. 22, 1952 |
| 2,582,963 | Cachat | Jan. 22, 1952 |
| 2,632,840 | Sorensen | Mar. 24, 1953 |

FOREIGN PATENTS

| Number | Country | Date |
| --- | --- | --- |
| 15,216 | Great Britain | June 12, 1913 |